US009595357B2

United States Patent
Lee et al.

(10) Patent No.: US 9,595,357 B2
(45) Date of Patent: Mar. 14, 2017

(54) PASSIVE COOLING SYSTEM OF NUCLEAR POWER PLANT

(75) Inventors: Sang Jong Lee, Daejeon (KR); Young Baek Kim, Daejeon (KR); Byung Chan Baek, Daejeon (KR); Hae Nam Yang, Daejeon (KR); Dae Jin Lee, Daejeon (KR); Young Jae Choi, Daejeon (KR); Jae Kyu Lee, Daejeon (KR); Kyun Heo, Daejeon (KR); Kyung Woo Shim, Daejeon (KR); Seoung Eun Chun, Daejeon (KR)

(73) Assignee: KEPCO NUCLEAR FUEL CO., LTD., Daejeon (KR)

( * ) Notice: Subject to any disclaimer, the term of this patent is extended or adjusted under 35 U.S.C. 154(b) by 585 days.

(21) Appl. No.: 13/606,413

(22) Filed: Sep. 7, 2012

(65) Prior Publication Data

US 2013/0064342 A1    Mar. 14, 2013

(30) Foreign Application Priority Data

Sep. 8, 2011    (KR) .......................... 10-2011-0091159

(51) Int. Cl.
*G21C 15/18*    (2006.01)
*G21D 3/06*    (2006.01)

(52) U.S. Cl.
CPC .............. *G21D 3/06* (2013.01); *G21C 15/18* (2013.01); *Y02E 30/40* (2013.01)

(58) Field of Classification Search
CPC ...... G21C 15/18; G21C 15/16; G21C 15/257; Y02E 30/40; G21D 3/06; G21Y 2002/00; G21Y 2002/207; F22B 1/16; G21B 1/00

USPC ....... 376/299, 298, 402, 243, 272, 403, 357, 376/370, 317, 203.1, 179, 203; 165/900
See application file for complete search history.

(56) References Cited

U.S. PATENT DOCUMENTS

| 3,270,522 A | * | 9/1966 | McNeely | ......................... 62/476 |
| 4,299,660 A | * | 11/1981 | Quade | ........................... 376/298 |
| 4,571,323 A | * | 2/1986 | Costes | ........................... 376/282 |
| 4,587,079 A | * | 5/1986 | Fajeau et al. | .................. 376/282 |
| 4,643,871 A | * | 2/1987 | Fajeau | ........................... 376/282 |
| 4,760,706 A | * | 8/1988 | Nasser | ........................... 60/675 |

(Continued)

FOREIGN PATENT DOCUMENTS

| CN | 101710494 A | | 5/2010 | | |
| CN | 201836969 U | * | 5/2011 | ............... | F24D 3/18 |

(Continued)

*Primary Examiner* — Jack W Keith
*Assistant Examiner* — Daniel Wasil
(74) *Attorney, Agent, or Firm* — Rabin & Berdo, P.C.

(57) ABSTRACT

A passive cooling system of a nuclear power plant includes a steam generator, a cooling water storage tank, a water cooling heat exchanger, an air cooling heat exchanger, a divergence valve, and a cooling tower. The steam generator generates steam by heat exchange with a primary coolant system, and the cooling water storage tank stores cooling water therein. The water cooling heat exchanger is disposed in the cooling water storage tank, and the air cooling heat exchanger is connected to the steam generator. The divergence valve is controllable to divert steam from the steam generator into both the water cooling heat exchanger and the air cooling heat exchanger. Each of the cooling water storage tank, the water cooling heat exchanger, and the air cooling heat exchanger are located in the cooling tower.

3 Claims, 3 Drawing Sheets

(56) References Cited

U.S. PATENT DOCUMENTS

| | | | | |
|---|---|---|---|---|
| 5,102,617 | A | * | 4/1992 | Gluntz et al. ................. 376/283 |
| 5,215,708 | A | * | 6/1993 | Fennern et al. ............. 376/293 |
| 5,268,943 | A | * | 12/1993 | Corletti et al. ............... 376/282 |
| 5,398,267 | A | * | 3/1995 | Reinsch ....................... 376/298 |
| 5,488,828 | A | * | 2/1996 | Brossard ......................... 60/675 |
| 5,612,982 | A | * | 3/1997 | Woodcock et al. ........... 376/298 |
| 2009/0245453 | A1 | * | 10/2009 | Jeong et al. .................. 376/299 |

FOREIGN PATENT DOCUMENTS

| | | | | |
|---|---|---|---|---|
| JP | 1994-242279 | * | 2/1994 | ............ G21C 15/18 |
| JP | 06-242279 A | | 9/1994 | |
| JP | 07-072280 A | | 3/1995 | |
| JP | 2002-303692 A | | 10/2002 | |
| JP | 2006-138744 | * | 1/2006 | ............ G21C 15/18 |
| JP | 2009-243924 | * | 10/2009 | ............ G21C 15/18 |
| KR | 10-2002-0037105 A | | 5/2002 | |
| KR | 1020040051363 | * | 7/2004 | ............ F25B 30/00 |
| KR | 10-2006-0002360 A | | 1/2006 | |
| KR | 10-2009-0021722 A | | 3/2009 | |
| KR | 10-2009-0102079 A | | 9/2009 | |
| KR | 10-2010-0090990 A | | 8/2010 | |

\* cited by examiner

PASSIVE COOLING SYSTEM OF NUCLEAR POWER PLANT

CROSS-REFERENCE TO RELATED APPLICATIONS

The present application claims priority benefits under 35 U.S.C. §119 to Korean Patent Application No. 10-2011-0091159, filed Sep. 8, 2011

BACKGROUND OF THE INVENTION

1. Field of the Invention

The present invention relates to a passive cooling system of a nuclear power plant, and more particularly to a passive cooling system in which a method for removing the heat from a secondary coolant system required to cool a nuclear core is implemented, in an event of an accident of a nuclear power plant using a natural circulation method.

2. Description of the Related Art

An auxiliary feedwater system is provided in a nuclear power plant to ensure safety in operating a nuclear reactor.

The auxiliary feedwater system is used to maintain a steam generator level when a primary feedwater system is not operable such that a nuclear reactor cooling system is shifted from a hot standby state into a cold shutdown state.

When an accident occurs in the nuclear power plant, a decay heat (or residual heat) can be removed through a steam generator of a secondary coolant system (or an auxiliary system) in order to cool nuclear fuels loaded on a nuclear core.

In a prior art, a condensing storage tank and an auxiliary feedwater pump are used to perform a heat removal operation through the steam generator. A feedwater system using a pump requires a power and, when the power is not available, the feedwater system is not operable.

Such conventional cooling system of the nuclear power plant is disclosed in Korea Patent Publication No. 2002-0037105, which is published May, 18, 2002.

In the conventional cooling system, when a feedwater is supplied to the steam generator for a cooling operation, the core decay heat (or residual heat) conveyed from a primary coolant system can be removed in the steam generator.

However, such conventional cooling system is of an active type, which can be operated only by an electricity supply. Thus, the conventional cooling system has a problem such that it cannot be operated when an accident occurs in which the electricity supply is interrupted.

SUMMARY OF THE INVENTION

Accordingly, the present invention has been made keeping in mind the above mentioned problems occurring in the related art, and an object of the present invention is to provide a passive cooling system of a nuclear power plant, which can be operated in an auxiliary feedwater system in a passive manner to remove a core decay heat (or residual heat), even in a case where an electricity supply is interrupted due to an accident.

In order to accomplish the above mentioned object, the present invention provides a passive cooling system of a nuclear power plant, the passive cooling system comprising: a cooling water storage tank configured to store a cooling water therein; a steam generation unit in which a steam is generated by a heat exchange with a primary coolant system including a nuclear reactor; a water cooling heat exchange unit connected to the steam generation unit and provided within the cooling water storage tank; and an air cooling heat exchange unit connected to the steam generation unit and provided outside the cooling water storage tank.

Here, preferably, the water cooling heat exchange unit and the air cooling heat exchange unit are positioned above the steam generation unit such that the cooling water and the steam have a continuous circulation by a self weight and convection.

Preferably, the air cooling exchange unit includes a cooling tower positioned therein.

Preferably, the cooling tower includes the cooling water storage tank positioned therein such that the water cooling heat exchange unit is positioned within the cooling water storage tank and the air cooling heat exchange unit is positioned inside the cooling tower and outside the cooling water storage tank.

Preferably, an air inlet is formed on a lower portion of the cooling tower.

Preferably, the passive cooling system of the nuclear power plant further comprises a steam pipe configured to connect an upper portion of the steam generation unit and an upper portion of the water cooling heat exchange unit and an upper portion of the air cooling heat exchange unit; and a feedwater pipe configured to connect a lower portion of the water cooling heat exchange unit and a lower portion of the air cooling heat exchange unit and a lower portion of the steam generation unit.

Preferably, the passive cooling system of the nuclear power plant further comprises a divergence valve positioned at a location in which the steam pipe is diverged such that the steam generated by the steam generation unit is introduced to the water cooling heat exchange unit and the air cooling heat exchange unit, wherein an amount of the steam is controlled; and an open/close valve positioned at a location farther away from the steam generation unit than the divergence valve on the steam pipe.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

Hereinafter, an exemplary embodiment of the present invention will be described in detail with reference to the attached drawings.

Figure 1:
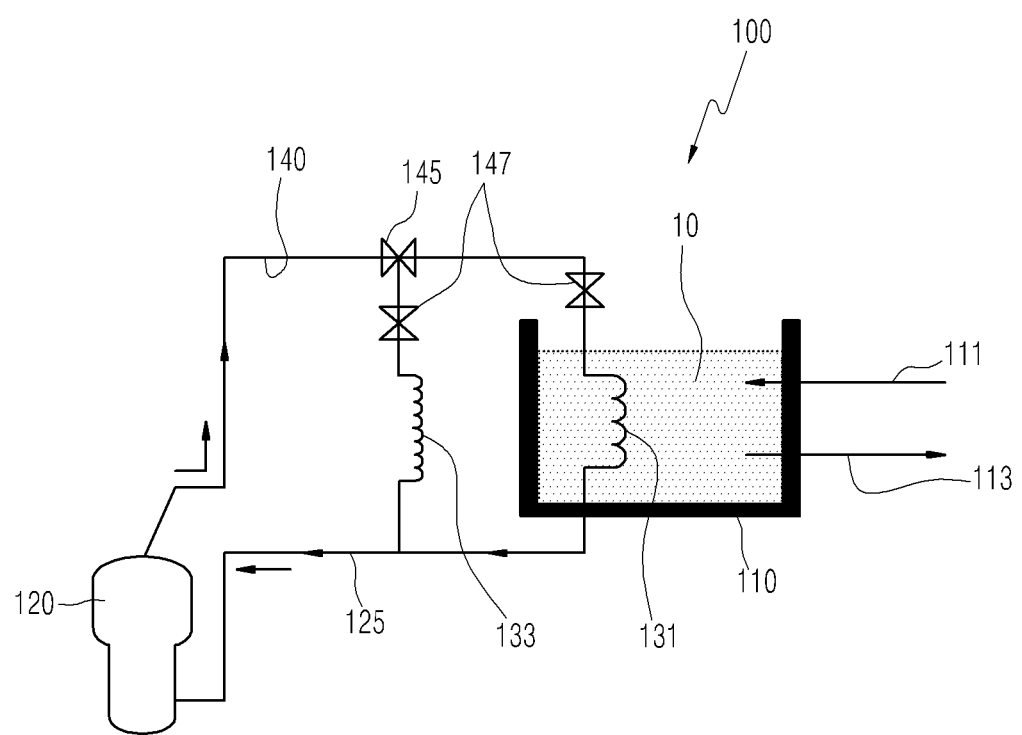
FIG. 1 is a configuration view of a passive cooling system of a nuclear power plant according to an exemplary embodiment of the present invention.

As shown in FIG. 1, a cooling system 100 of a nuclear power plant using a pressurized water reactor according to the present invention can apply to an secondary coolant system (steam generator—steam pipe—high temperature turban—low temperature turban—condenser—feedwater pipe—steam generator) that is connected to a turban through the steam generator, which is connected to a primary coolant system, instead of applying to the primary coolant system (nuclear reactor—hot leg pipe—steam generator—coolant pump—cold leg pipe—nuclear reactor), wherein the secondary coolant system is used to secure safety of a nuclear reactor including a pressurized water reactor, a pressurized heavy water reactor, a boiling water reactor, and a boiling heavy water reactor. The cooling apparatus 100 includes a water cooling part that exchanges a heat from the secondary coolant system with water and an air cooling part that exchanges the heat from the secondary coolant system with an air. Specifically, the cooling apparatus 100 includes a cooling water storage tank 110 in which a cooling water 10 is stored and a steam generation unit 120 in which a steam is generated by a heat exchange with the primary coolant system including the nuclear reactor, a water cooling heat exchange unit 131 connected to the steam generation unit 120 and provided within the cooling water storage tank 110, and an air cooling heat exchange unit 133 connected to the steam generation unit 120 and provided outside the cooling water storage tank 110.

Accordingly, in an emergency situation, a core decay heat (or residual heat) can be removed by cooling the auxiliary system. Specifically, a light steam generated in the steam generation unit 120 is discharged through an upper portion of the steam generation unit 120 to be introduced to the heat exchange unit 130. When the steam passes through the heat exchange unit 130, the steam is condensed such that the steam is reintroduced in a state of a liquid water into a lower portion of the steam generation unit 120. Thus, even when an electric power supply is interrupted due to an accident, the core decay heat (or residual heat) can be cooled down, thereby operating the cooling system 100 of a nuclear power plant in the secondary coolant system in a passive manner without requiring, for example, a pump.

In addition, as shown in FIG. 1, the cooling system 100 of the nuclear power plant according to the present invention preferably further includes a steam pipe 140 configured to connect the upper portion of the steam generation unit 120 to an upper portion of the water cooling heat exchange unit 131 and the air cooling heat exchange unit 133, a feedwater pipe 125 configured to connect the lower portion of the steam generation unit 120 to a lower portion of the water cooling heat exchange unit 131 and a lower portion of the air cooling heat exchange unit 133, a divergence valve 145 positioned at a diverging point of the steam pipe 140 such that an amount of the steam generated in the steam generation unit 120 can be controlled to be provided to the water cooling heat exchange unit 131 and the air cooling heat exchange unit 133, and an open/close valve 147 positioned at a point farther away from the steam generation unit 120 than the divergence valve 145 on the steam pipe 140.

Accordingly, a condensate generated while passing through the water cooling heat exchange unit 131 and the air cooling heat exchange unit 133 flows into the steam generation unit 120 through the feedwater pipe 125, and the steam generated in the steam generation unit 120 can be introduced to the water cooling heat exchange unit 131 and the air cooling heat exchange unit 133. Where, the steam can be selectively provided to the water cooling heat exchange unit 131 and/or the air cooling heat exchange unit 133 by using the divergence valve 145 and the open/close valve 147.

According to an exemplary embodiment of the present invention, the feedwater pipe 125 is preferably provided on an upper portion of the water cooling heat exchange unit 131 and the air cooling heat exchange unit 133 and the steam pipe 140 is preferably provided on the lower portion of the water cooling heat exchange unit 131 and the lower portion of the air cooling heat exchange unit 133.

In order to control the divergence valve 145 (i.e., to control a steam path such that the steam flows to the water cooling heat exchange unit 131 and/or the air cooling heat exchange unit 133), a controller (not shown) can be provided to control the divergence valve 145 based on automatic calculation of an amount of heat to be cooled or based on amount of heat to be removed by the water cooling heat exchange unit 131 and the air cooling heat exchange unit 133. Alternatively, an operator can directly manipulate the divergence valve 145. Here, it is preferable that a water level of the steam generation unit 120 is maintained at a constant level.

According to an exemplary embodiment of the present invention, as shown in HG. 1, the water cooling heat exchange unit 131 and the air cooling heat exchange unit 133 are preferably positioned above the steam generation unit 120 such that a refrigerant (or a coolant) circulating through the steam generation unit 120, the heat exchange unit 130 and the feedwater pipe 125, can have a continuous circulation in a passive manner by a self weight and convection.

Accordingly, the circulation can be continuous in a passive manner without requiring a separate driving power such as an electric power, by using the fact that a steam is lighter and water is heavier, which causes natural convection and gravity.

Meanwhile, the cooling water storage tank 110 preferably includes a cooling water supply pipe 111 for supplying the cooling water 10 from an external and a cooling water diffusion pipe 113 to discharge the cooling water 10 to the external.

Accordingly, by providing the water cooling heat exchange unit 131 and the air cooling heat exchange unit 133 both within and outside the cooling water storage tank 110, a disadvantage of a conventional passive auxiliary feedwater system (PAFS) that a cooling operation is interrupted when the cooling water is depleted can be overcome, and a permanent cooling is possible by using an air cooling. Also, a problem of a thermal shock caused when using only an water cooling can be avoided. In addition, by dividing the cooling operation by the water cooling and the air cooling, a size of the water cooling heat exchange unit and the water cooling storage tank can be reduced. In other words, the water cooling heat exchange unit having a larger cooling capacity can be used with the air cooling heat exchange unit at an early stage of an accident, wherein the size of the water cooling heat exchange unit can still be reduced compared to the conventional passive auxiliary feedwater system, and the air cooling can be used at a later stage of the accident in which the cooling water of the water cooling heat exchange unit is heated.

Figure 2:
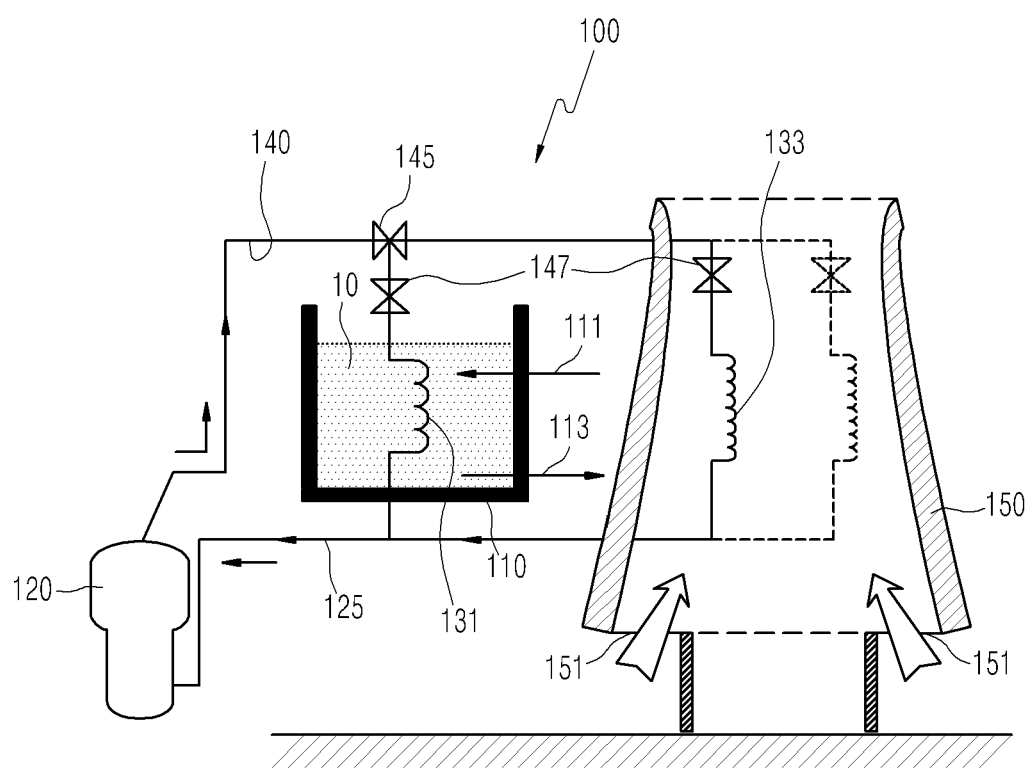
FIG. 2 is a configuration view of a passive cooling system of a nuclear power plant according to another exemplary embodiment of the present invention.
Figure 3:
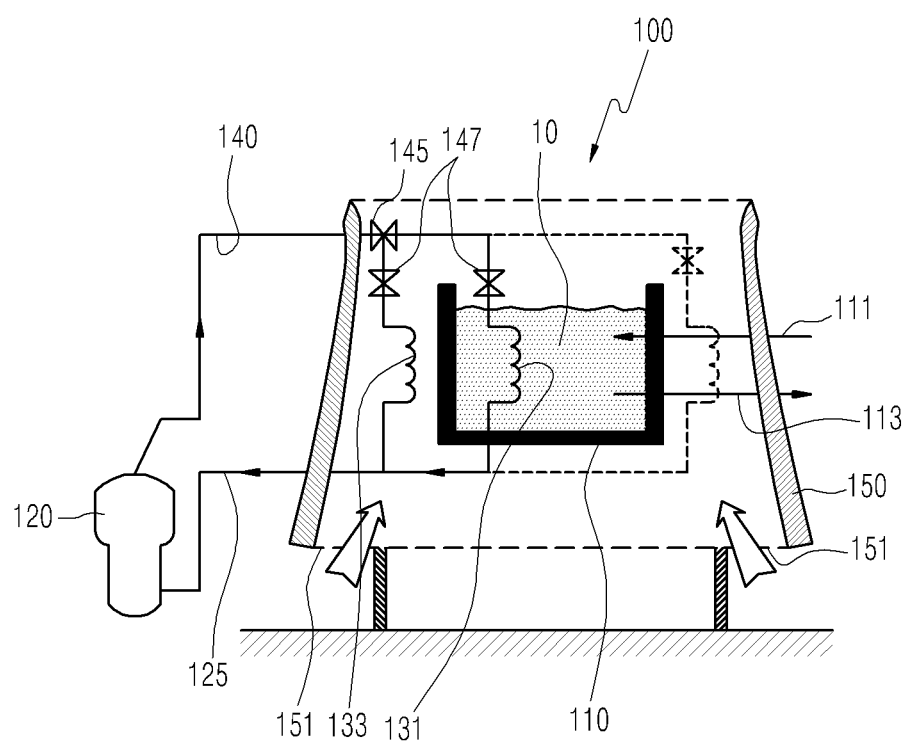
FIG. 3 is a configuration view of a passive cooling system of a nuclear power plant according to still another exemplary embodiment of the present invention.

Meanwhile, as shown in FIGS. 2 and 3, the passive cooling system 100 of the nuclear power plant according to another embodiment of the present invention can further include a cooling tower 150 in which the air cooling heat exchange unit 133 is provided.

Accordingly, the cooling tower 150 provides an installation site of the air cooling heat exchange unit 133 and can improve a heat exchange efficiency by using a phenomenon in which an atmospheric pressure difference causes a wind to blow from bottom to top.

An air inlet 151 is preferably provided on a lower portion of the cooling tower 150 such that an external air is naturally introduced inside the cooling tower 150.

Accordingly, the heat exchange efficiency of the air cooling heat exchanger 133 can be improved by introducing the air into an interior of the cooling tower 150.

A process of cooling the steam generation unit 120 includes a cycle of the following operations: evaporation of the feedwater within the steam generation unit 120—convection—rise of the steam—cooling of the steam by the water cooling heat exchange unit 131 and the air cooling heat exchange unit 133—condensation of the steam—pulling by gravity—supply of the feedwater—evaporation. Accordingly, a circulation generating device such as a pump is not needed, and therefore, an energy supply for operating such device is not needed. Thus, the passive cooling system 100 in which a cooling is performed by the convection and the heat exchange with the air and the cooling water is implemented. The water cooling and the air cooling are complementary to each other and a problem of increase in size due to a limited heat exchange capacity of each of the water cooling and the air cooling can be solved by using the water cooling heat exchange unit 131. Also, the problem such that the cooling is interrupted when the cooling water is evaporated, which may occur when employing only the water cooling heat exchange unit 131 can be overcome. Further, when only the water cooling heat exchange unit 131 is employed, a size thereof can be increased due to the cooling capacity requirement such that a sudden cooling occurs at a beginning stage of the cooling operation, thereby applying a heat shock to a pipe. However, a heat cooling performance can be adjusted by employing both the water cooling and the air cooling, thereby avoiding the heat shock problem.

The present invention can apply to any type of a nuclear reactor in which the steam generation unit 120 is installed, regardless of whether the steam generation unit 120 is directly or indirectly connected to the nuclear core or whether the steam generation unit 120 is separately provided.

Meanwhile, as shown in HG. 3, according to another embodiment of the present invention, the cooling water storage tank 110 is positioned within the cooling top 150, wherein the water cooling heat exchange unit 131 is preferably provided within the cooling water storage unit 110 and the air cooling heat exchange unit 133 is provided outside the cooling water storage tank 110 and inside the cooling top 150.

A heat generated in the nuclear core is conveyed to the steam generation unit 120 through the primary coolant system and conveyed to the secondary coolant system through a heat exchange occurring at the steam generation unit 120.

The steam generation unit 120 is filled with the feedwater, which is evaporated by a heat conveyed from the nuclear ore.

The evaporated steam is floated along the steam pipe 140 installed above the steam generation unit 120. The divergence valve 145 is provided at a location in which the steam pipe 140 is diverged so that a steam path is controlled to provide the steam to at least one of the air cooling heat exchange unit 133 and the water cooling heat exchange unit 131. Meanwhile, the steam provided to the water cooling heat exchange unit 131 passes through the water cooling heat exchange unit 131 installed within the cooling water storage tank 110 in which the cooling water 10 is contained. When the steam passes through the water cooling heat exchange unit 131, the steam is caused to exchange a heat with the cooling water 10. During a process of the heat exchange, a condensed steam is moved downward due to gravity and reintroduced to and recovered by the steam generation unit 120 through the feedwater pipe 125 installed on the lower portion of the water cooling heat exchange unit 131. Meanwhile, the steam provided to the air cooling heat exchange unit 133 passes through the air cooling heat exchange unit 133 in which the steam exchanges a heat with an air. During the process of the heat exchange, a condensed steam is moved downward due to gravity and reintroduced to and recovered by the steam generation unit 120 through the feedwater pipe 125 installed on the lower portion of the air cooling heat exchange unit 133. The above described process includes a cycle of natural convection—condensation—pulling by gravity, and thus, it is preferable that the water cooling heat exchange unit 131 and the air cooling heat exchange unit 133 are positioned above the steam generation unit 120.

In order to improve an air cooling efficiency, an air-cooling space can be installed separately. For example, the air-cooling space in a form of the cooling tower 150 may be introduced. The cooling tower 150 is provided in a structure in which an upper portion and a lower portion are exposed open and the air cooling heat exchange unit 133 is installed within the cooling tower 150. A wind of an atmospheric pressure introduced from the lower portion is caused to blow upwardly due to a pressure difference according to a height of the cooling tower 150. Therefore, the air cooling efficiency can be increased by blowing the wind to a surface of the air cooling heat exchange unit 133 installed in the cooling tower 150.

Thus, according to the present invention, even when the electrical supply is interrupted due to an accident, the cooling system 100 of the nuclear power plant can be operated in a passive manner to remove the core decay heat (or the residual heat).

According to the present invention, even when the electric power supply is interrupted due to an accident, the passive auxiliary feedwater system (PASFS) of the nuclear power plant can be operated in a passive manner in the auxiliary feedwater system to remove the core decay heat (or the residual heat).

In addition, the disadvantage of the conventional passive auxiliary feedwater system (PAFS) in which the cooling operation is interrupted when the cooling water is depleted can be solved by implementing the permanent cooling using the air cooling. Also, the problem of the heat shock occurring when only the water cooling is employed can be mitigated. Because the cooling operation is performed by using the air cooling and the water cooling, a size of the water cooling heat exchange unit and the cooling water storage tank can be reduced. Namely, in an initial stage of an accident in which a lot of heat is generated, both the water cooling heat exchange unit having a large cooling capacity and the air cooling heat exchange unit can be used to perform the cooling operation, wherein the size of the water cooling heat exchange unit can still be reduced compared to the conventional passive auxiliary feedwater system. In a later stage of the accident in which the cooling water of the water cooling heat exchange unit is heated, air cooling can be used to perform the cooling operation.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A passive cooling system of a nuclear power plant, the passive cooling system comprising:
   a steam generator in which steam is generated by heat exchange with a primary coolant system including a nuclear reactor;
   a cooling water storage tank storing cooling water therein;
   a water cooling heat exchanger disposed in the cooling water storage tank;
   an air cooling heat exchanger connected to the steam generator in parallel with the water cooling heat exchanger,
      wherein the air cooling heat exchanger is located outside of the cooling water storage tank;
   a divergence valve controllable to divert steam from the steam generator into both the water cooling heat exchanger and the air cooling heat exchanger,
      wherein the divergence valve controls the flow of steam generated in the steam generator which passes through the water cooling heat exchanger to be condensed by heat exchange with the cooling water,
      wherein the divergence valve controls the flow of steam generated in the steam generator which passes through the air cooling heat exchanger to be condensed by heat exchange with ambient air, and
      wherein the divergence valve includes an inlet, a first outlet, and a second outlet;
   a first pipe connecting an upper portion of the steam generator and the inlet of the divergence valve,
      wherein the first pipe allows steam generated in the steam generator to flow from the steam generator to the divergence valve;
   a second pipe connecting the first outlet of the divergence valve and an inlet of the water cooling heat exchanger,
      wherein the second pipe allows steam generated in the steam generator to flow from the first outlet of the divergence valve to the water cooling heat exchanger;
   a third pipe connecting the second outlet of the divergence valve and an inlet of the air cooling heat exchanger,
      wherein the third pipe allows steam generated in the steam generator to flow from the second outlet of the divergence valve to the air cooling heat exchanger;
   a fourth pipe connected to each of an outlet of the water cooling heat exchanger, an outlet of the air cooling heat exchanger, and a lower portion inlet of the steam generator,
      wherein the fourth pipe allows condensed steam to flow from the water cooling heat exchanger to the lower portion inlet of the steam generator,
      wherein the fourth pipe allows the condensed steam from the water cooling heat exchanger to be introduced in a liquid water state into the lower portion inlet of the steam generator,
      wherein the fourth pipe allows condensed steam to flow from the air cooling heat exchanger to the lower portion inlet of the steam generator, and
      wherein the fourth pipe allows the condensed steam from the air cooling heat exchanger to be introduced in a liquid water state into the lower portion inlet of the steam generator;
   a first open/close valve disposed in the second pipe,
      wherein the first open/close valve controls the flow of the steam passing through the second pipe;
   a second open/close valve disposed in the third pipe,
      wherein the second open/close valve controls the flow of the steam passing through the third pipe; and
   a cooling tower,
      wherein each of the cooling water storage tank, the water cooling heat exchanger, and the air cooling heat exchanger are located in the cooling tower.

2. The passive cooling system according to claim 1, wherein the water cooling heat exchanger and the air cooling heat exchanger are positioned above the steam generator such that the cooling water and the steam naturally circulate by gravity.

3. The passive cooling system according to claim 1, wherein the cooling tower having an air inlet in a lower portion thereof.

* * * * *